Aug. 25, 1959 S. L. BROADHEAD, JR 2,901,729

PHASE-SELECTIVE CONTROL SYSTEM

Filed March 12, 1956 4 Sheets-Sheet 1

INVENTOR.

SAMUEL L. BROADHEAD, JR.

BY Moody and Goldman

ATTORNEYS

INVENTOR.
SAMUEL L. BROADHEAD, JR.
BY Moody and Goldman
ATTORNEYS

PHASE-SELECTIVE CONTROL SYSTEM

Filed March 12, 1956 4 Sheets-Sheet 3

INVENTOR.
SAMUEL L. BROADHEAD, JR.
BY Moody and Goldman
ATTORNEYS

Aug. 25, 1959 S. L. BROADHEAD, JR 2,901,729

PHASE-SELECTIVE CONTROL SYSTEM

Filed March 12, 1956 4 Sheets-Sheet 4

INVENTOR.
SAMUEL L. BROADHEAD, JR.
BY Moody and Goldman
ATTORNEYS

United States Patent Office 2,901,729

Patented Aug. 25, 1959

2,901,729

PHASE-SELECTIVE CONTROL SYSTEM

Samuel L. Broadhead, Jr., Cedar Rapids, Iowa, assignor to Collins Radio Company, Cedar Rapids, Iowa, a corporation of Iowa Application March 12, 1956, Serial No. 570,938

6 Claims. (Cl. 340—170)

This invention relates generally to remote control systems and particularly to a system which can select remote functions by phasing means.

The invention may be used with a plurality of control stations and remote stations, and either radio waves or wire may be used as their transmission medium. The invention is particularly useful with wire-connected remote control systems, where a minimum number of interconnecting wires is required.

This invention utilizes a reference-phase wave, which is common to the control and remote stations. An alternating-current power source, that is common to the control and remote stations, provides a wave that may be used to provide the reference phase, thereby eliminating the necessity for additional connecting wires.

Furthermore, where common power wiring is available, as in a building, ship or aircraft, the common wiring may also be used as the information transmission medium. Then, no additional wiring need be added to interconnect the remote and control stations of the invention.

The invention may use a single-carrier frequency for all of its stations. A large number (such as 20 or 30) of remote stations may be connected to the same line. Where distances are large between control and remote stations of the invention and high level noise is coupled to the line, a two-wire transmission line, that is balanced-to-ground, may be preferable to a single unbalanced wire for the transmission of information.

The invention is also useful in systems which combine control and remote functions at each station. In such a system, any station can selectively control a function at any chosen one of the other stations. An example of this type of system is an intercommunication system, often called an "intercom system."

Each station in an intercommunication system is assigned a given phase with respect to the reference wave, and any station may transmit selectively to any other station by merely turning a knob to a position that indicates the chosen station (or an equivalent control function).

All stations in a network, but the selecting station and the selected station, can automatically be locked out by the invention. Therefore, a private conversation is permitted between the selecting and selected stations, although the same carrier frequency is used by all stations.

The invention uses a phase-shifting network to control the selection of stations in a network. A station may select any one of a plurality of phases with respect to a reference wave for transmission to select a given station. Also, each station may select its assigned phase from the phase-shift network.

Each remotely controllable station includes a gated-beam tube as a phase-comparing device. The assigned phase is provided to one of the electrodes of the gated-beam tube, and another electrode receives a remotely selected phase, which can enable the selected station and disable non-selected stations.

Each station will have the plate current of its gated-beam tube cut off only when the incoming phase, determined by the sending station, is substantially 180° out-of-phase with the assigned phase of the given station. This opposite phase condition in a given gated-beam tube is called "anticoincidence" in this specification. At all received phases other than the anticoincidence phase, plate current will flow. The condition of plate current cutoff may be utilized to enable reception at the selected station, and the condition of plate current flow may be used to disable reception.

It is often desirable to operate the gated-beam tube with a negative direct-voltage supply applied to its cathode to maintain the plate voltage of the gating tube at preferred direct-voltage levels, so that it may connect directly to a following switching tube.

Each remotely controllable station may have the same circuitry, except that it is assigned a different phase.

Further objects, features and advantages of this invention will be apparent to a person skilled in the art upon further study of this invention, in which.

Figure 1:
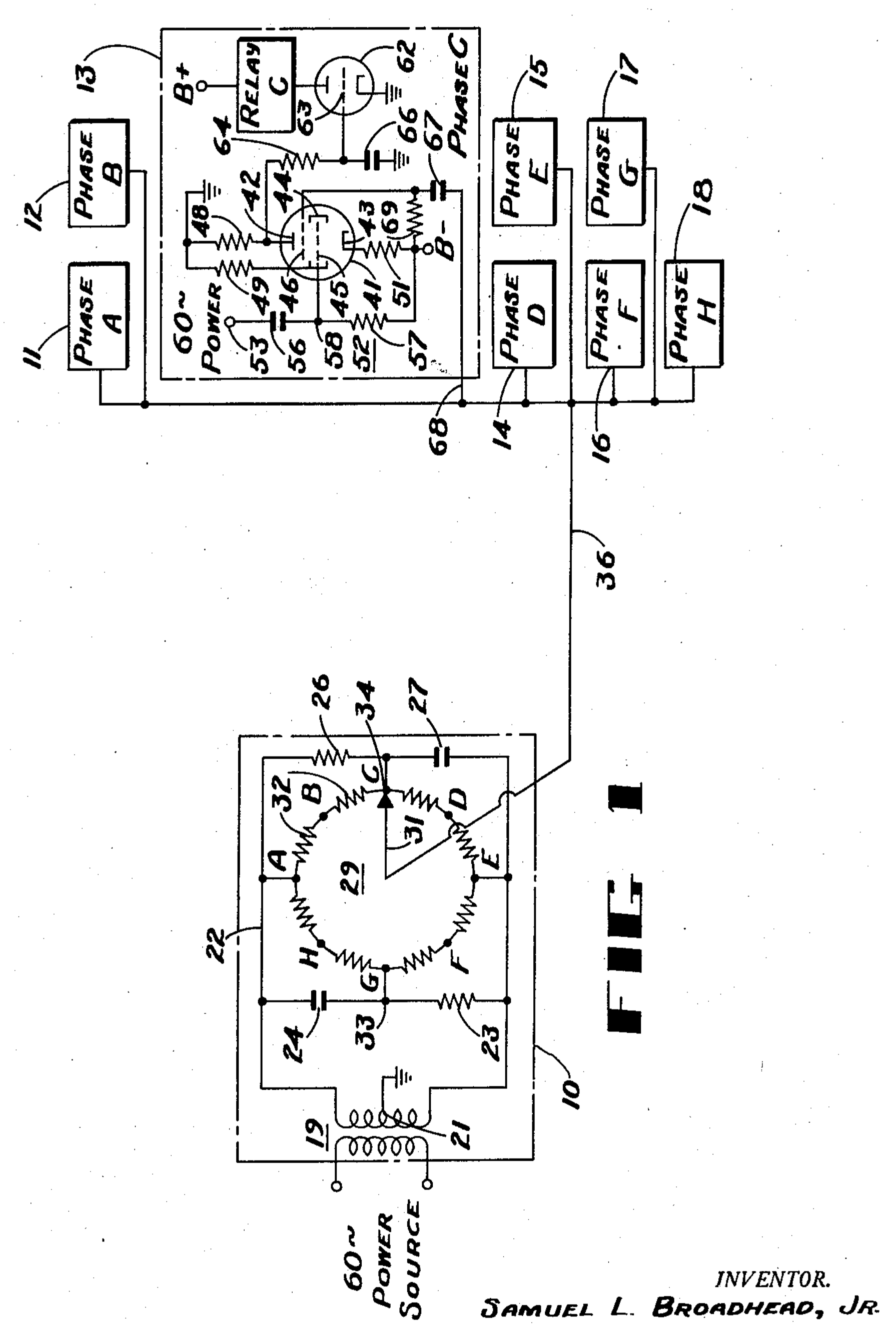
Figure 1 illustrates a remote control system utilizing the invention.

Now referring to the invention in more detail, Figure 1 illustrates a remote switching system, wherein a single control station 10 is used to selectively control the switching operation of a plurality of remote stations 11 through 18.

A 60 cycle-per-second power source is assumed to be common to all stations in Figure 1.

Control station 10 is connected to the common power source through a transformer 19, which has a secondary 21 with a center-tap connected to ground.

A conventional phase-shifting network 22 is connected across secondary 21. Network 22 has a resistor 23 and a capacitor 24 connected in series across secondary 21; and in a similar but reversed manner, another resistor 26 and another capacitor 27 are connected in series across secondary 21. A tap switch 29 is provided in Figure 1 having a single pole 31 and eight contact terminals designated A through H. A plurality of eight equal resistors 32 are respectively connected between switch terminals A–H. Terminal G is connected to the intermediate point 33 between resistor 23 and capacitor 24; while terminal C is connected to the intermediate point 34 between the other capacitor 27 and resistor 26. Terminal A is connected to one side of secondary 21, and terminal E is connected to its opposite side.

The series resistors and capacitors are adjusted to provide 180 degree opposite-phase waves at terminals G and C. However, the series resistors and capacitors are also adjusted to maintain these waves with a 90 degree phase relationship to the waves at terminals A and E. Then, the waves at terminals A through H will be displaced phase-wise by 45 degree intervals.

Remote station 13 is shown in detail, and it will be presumed in Figure 1 that the circuitry of the other stations is substantially identical, except perhaps for the circuit providing a station's assigned phase.

A single transmission line 36 in Figure 1 connects control station 10 to its remote stations, and a ground return path is assumed. Also, a two-wire balanced line may be substituted for single wire line 36 and the ground return in Figure 1, if unbalanced-to-balanced line terminations, such as transformers, are provided. It is well known that the balanced line has immunity to certain types of noise that the single wire line does not have. Pole 31 connects to one end of line 36.

Remote station 13, has a gated-beam tube 41, which includes a plate 42, a cathode 43, an eccelerator electrode 44, a limiter grid 45, and a phasing grid 46 (often called a quadrature grid). The gated-beam tube may be a type generally designated in the industry as a 6BN6. Plate 42 is connected to ground through a resistor 48; and in a similar manner, the accelerator electrode is connected to ground through another resistor 49. Cathode 43 is connected to a negative direct-voltage supply, designated as B-minus, through a cathode-biasing resistor 51. Also, grid-leak bias may be used.

A phase-shift network 52 is connected between the common alternating-power source at terminal 53 and the B-minus source. Net work 52 comprises a capacitor 56 and a resistor 57 connected in series. Limiter grid 45 is connected to intermediate point 58 on network 52. Phasing grid 46 is connected through a blocking capacitor 67 to a lead 68, which connects in common to all of the remote stations and to the end of transmission line 36. A resistor 69 connects between phasing grid 46 and the B-minus voltage supply terminal.

In remote station 13, an amplifier and switching tube 62 is shown, which has its control grid 63 connected to plate 42 of gated-beam tube 41 through a resistor 64. A capacitor 66 connects between its control grid 63 and ground to bypass to ground alternating components of plate current from tube 41. The cathode of amplifier tube 62 is connected to ground; and a relay C is connected between its plate and a B-plus source and is the controlled switching function at remote station 13. It is to be realized that many other types of control functions may be used instead of a relay at any remote station.

In the operation of the system of Figure 1, pole 31 of phase-shift circuit 22 can select any one of eight phases spaced by 45 degree increments at the respective terminals A through H.

Of course, any number of phases may be provided by a phase-shift network of the same type by varying the number and connection of terminal contacts of the rotary switch. Any number of remote stations may be used up to the number of phases provided by the control station. The phase selection does not require a high degree of accuracy for operation of the invention, unless the increment between adjacent phases is relatively small. Also, it is not necessary that the amplitude of each of the different phased outputs be equal, although the amplitudes should exceed a given minimum value.

Other phase-shift circuits, such as those utilizing resolvers, may be substituted for phase-shift circuit 22.

In Figure 1, the phase of a wave is always taken relative to the alternating power-source wave, which is common to both the control and remote stations.

Any of the phases A through H, that is selected by the control station, will be transmitted over transmission line 36 and will be received simultaneously on the phasing grids of the gated-beam tubes in all of the remote stations. However, anticoincidence can exist in only one of the remote stations, since the assigned phase provided to a respective limiter grid will differ at every remote station.

Figure 4:
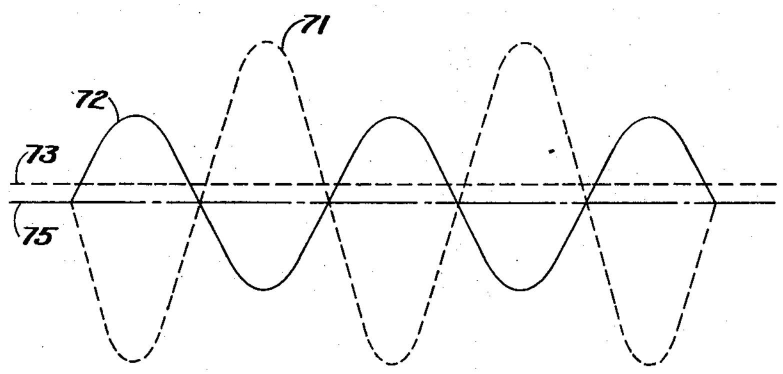
Figure 4 shows waveforms having an anticoincident phase relationship that may be utilized by the invention; and, Figure 5 shows waveforms having other phase relationships which may occur in this invention.

In the remote station where anticoincidence exists, the waveforms shown in Figure 4 will be obtained. Wave 71, in dashed lines, is the assigned phase wave provided to limiter grid 45 in station 13. Wave 72, in solid line, is received from transmission line 36 on phasing grid 46, after passing through blocking capacitor 67.

Plate-current conduction can exist in a gated-beam tube only when the limiter grid and phasing grid simultaneously exceed a potential level that is approximately the potential of the tube's cathode. Accordingly, the cathode potential is designated as the cutoff potential for each of the limiter and phasing grids. Plate current will not flow when only one grid exceeds cutoff. Line 73 in Figure 4 is the cutoff level for the grids and is determined by the value of cathode resistor 51. Thus, no plate current can flow in Figure 4 because there is no instant when the two voltages simultaneously exceed cutoff level 73. Accordingly, plate 42 is at ground potential in Figure 1, which maintains control grid 63 of the amplifier tube 62 at ground potential and in a conducting state. The alternating-voltage axis 75 is the B-minus voltage level. Relay C will therefore be energized, while gating tube 41 has no plate-current flow.

Now assume that control station 10 is required to actuate remote station B instead of station C actuated above. Pole 31 in control station 10 is now set to position B. The phase relationship at station 13 will now change to that shown in Figure 5. Assigned phase C remains on limiter grid 45, but the phase received on phasing grid 46 is shifted by 45 degrees as shown by wave 74 in Figure 5.

In this case, there will be instantaneous coincidence of the grid voltages during approximately a 45 degree period of each cycle. Conduction of plate current will occur during this period in the form of pulses 76, which will pass through plate resistor 48. These pulses will have a direct-current component that will cause plate 42 of the gated-beam tube to have voltage below ground potential; and this voltage is transmitted through resistor 64 to the control grid of amplifier tube 62 and is sufficient to bias tube 62 below cutoff. Accordingly, a cutoff condition exists for the tubes 62 in station 13 and in all other remote stations, where the phase relationships are different than shown in Figure 4. Only remote station 12 will be actuated by wave 74 in Figure 5, because only its assigned phase is 180 degrees opposite received phase B to provide the required anticoincidence.

Figure 2:
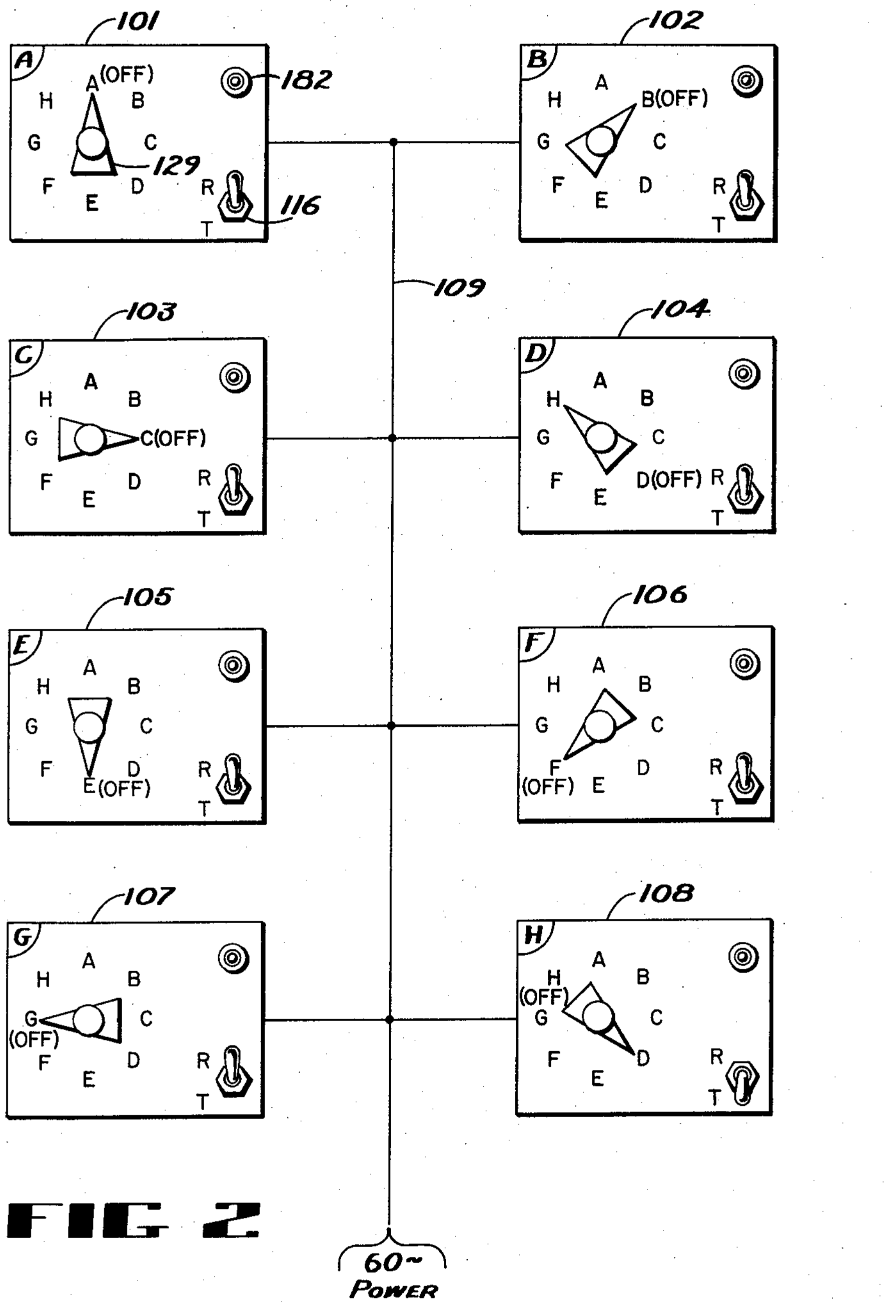
Figure 2 shows a plurality of intercommunication stations that use the invention.

Figure 2 illustrates another application of this invention wherein each station is provided with both a control and a remote function. The system of Figure 2 is commonly known as an "intercom system," and each station can both transmit and receive. Eight stations 101 through 108 are shown. Their only connecting medium is local alternating-current wiring 109, which schematically represents the wiring that may be found in almost any house or building. This wiring provides both the power necessary to operate the "intercom" stations, and the transmission medium for communication of intelligence. Thus, no further wiring is necessary after each of the stations is plugged to a receptacle connecting to the common wiring.

In Figure 2, a message may be transmitted from any one of the stations to any other of the stations in a selected manner, wherein no other station except the selected station can receive the transmission. Also, all the other stations may be automatically locked out during the transmission to prevent an interfering transmission. Each of stations in Figure 2 uses the same frequency spectrum.

Figure 3:
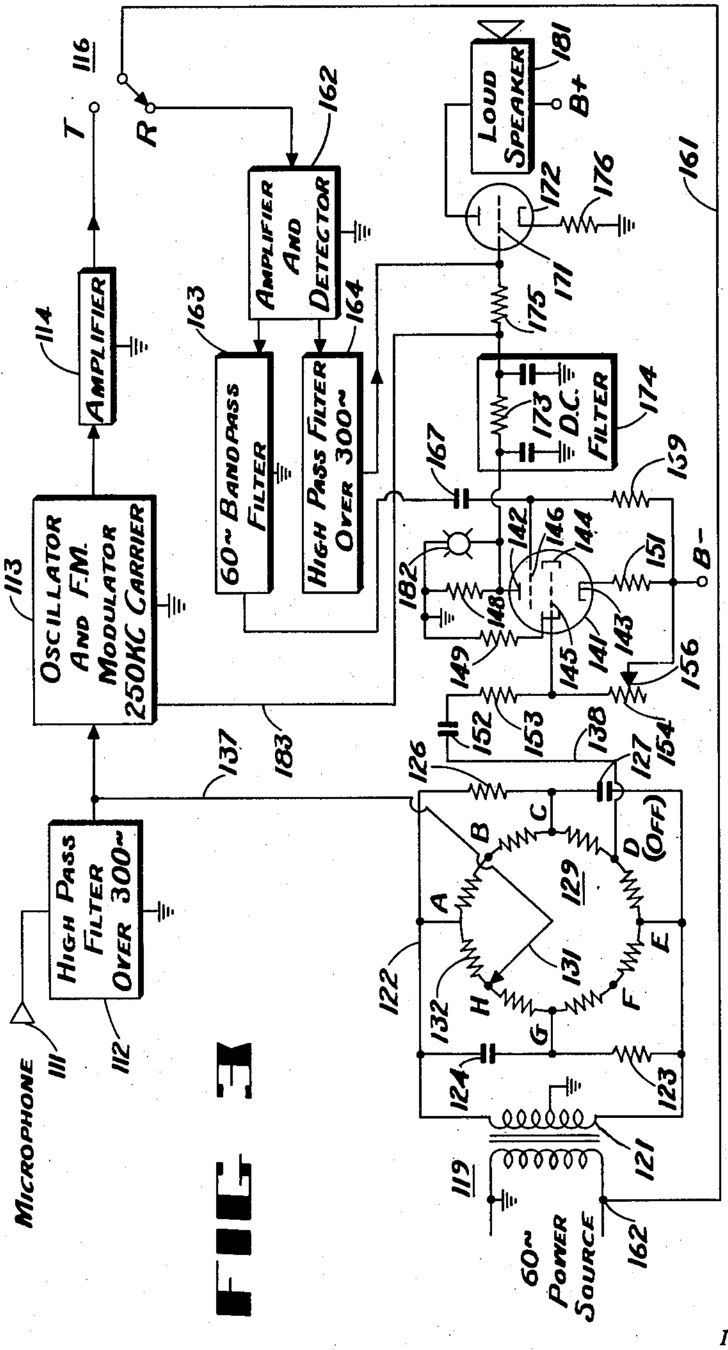
Figure 3 is an illustrative embodiment of any one of the stations shown in Figure 2.

The circuitry shown in Figure 3 may be used by each of the stations shown in Figure 2. It is noted in Figure 3 that frequency modulation is specified. However, any type of modulation may be used. Frequency modulation is shown in Figure 3 because it has a much better signal-to-noise ratio than amplitude modulation and can be easily obtained.

Whether or not amplitude modulation can be used will depend on the noise inherent in the power wiring 109 in Figure 2. For example, if wiring 109 is in a building, noise may be caused by rotating machinery, applicances, and switches of various sorts. A carrier frequency between 200 and 300 kilocycles per second is believed best for use with building wiring.

Both the phase information for selecting a remote station and the voice information may be transmitted on the same frequency. The phase information may be transmitted as a 60 cycle-per-second modulation; and voice information may be transmitted over a modulation band from 300 to 5000 cycles-per-second.

As shown in Figure 3, the transmission network in each station may include a microphone 111, which may be connected through a high-pass filter 112 to an F.M. modulator 113. Filter 112 is designed to attenuate 60 cycle-per-second frequency components provided from the microphone connection so that they will not interfere with the 60 cycle-per-second phase-selecting wave. Thus, filter 112 may be a conventional resistor-capacitor type network, which passes frequencies within a band from 300 cycles-per-second to perhaps 5000 cycle-per-second.

However, filter 112 is not essential to the operation of the invention, and therefore, may be left out, if desired. Particular operating conditions will determine if filter 112 is required, as for example the amount of 60 cycle-per-second stray flux which links the microphone and its lead-in cable.

Oscillator and F.M. modulator 113 may be of any conventional design. However, the circuit taught in patent application No. 548,028, to Jack D. Van Tilbury, filed November 21, 1955, now Patent 2,833,990, May 6, 1958, teaches how a single gated-beam tube may be used as a combined oscillator and frequency modulator. Furthermore, the same tube can also be used as a frequency-modulation detector by merely providing an additional switch that is actuated when the station is changed from receive to transmit conditions.

An amplifier 114 is connected between the output of modulator 113 and transmit contact T of a single-pole double-throw switch 116.

Phase-shifting network 122 in Figure 3 is identical to phase-shifting network 22 in Figure 1, and the reference numerals of identical components have the digit one added in Figure 3. Network 122 is similarly connected to building power wiring 109, shown in Figure 2, through a transformer 119. Rotary switch 129 has eight positions, designated also as A through H, and a single-pole 131, which may select any of these eight phases. Pole 131 determines which remote station shall be selected to receive a message, and it may be set to the contact that has the letter designation of the selected remote station, when a transmission is desired.

A lead 137 connects pole 131 to the input to modulator 113, and the phase of a selected remote station is transmitted as 60 cycle-per-second modulation.

When no transmission is desired, pole 131 may be set at the phase assigned to the local station which is marked "off." No station will then be actuated if switch 116 is accidentally moved to transmit position.

The assigned phase of each station is determined by the connection of a lead 138 to the terminal of tap switch 131 that is designated by the assigned call letter of the station. Thus, in Figure 3, lead 138 connects to terminal D which determines the assigned phase of the station.

A tube 141, which is a gated-beam tube, such as is designated in the industry as a 6BN6, receives assigned phase D on its limiter grid 145 through an attenuating network including blocking capacitor 152, resistor 153, and rheostat 154 which has its variable tap 156 connected to a B-minus voltage supply. Thus, resistor 153 and rheostat 154 can adjust the magnitude of the assigned-phase voltage applied to limiter grid 145.

Tube 141 has a plate resistor 148 connected between its plate and ground, and another resistor 149 is connected between its accelerator electrode 144 and ground. A cathode biasing resistor 151 is connected between its cathode and the B-minus direct-voltage power supply.

The phasing grid 146 of gated-beam tube 141 receives an incoming phase, which is remotely selected.

The pole of switch 116 normally engages its receive contact R. However, when a transmission is desired, the pole of switch 116 is actuated to engage transmit contact T. A lead 161 connects the pole of switch 116 to the ungrounded side 162 of the incoming power line. Thus, incoming information will be received from the power line over lead 161; and similarly, transmitted information will be transmitted over the line 161 into the power line system.

When any of the remote stations is transmitting, its carrier will pass through contact R of switch 116 to an amplifier and detector 162, which will detect the 60 cycle-per-second phase selecting signal and the voice information in the 300 to 5000 cycle-per-second band.

Detector 162 can utilize the same gated-beam tube as is used in modulator 113, when constructed according to the patent application cited above, by using another single-pole double-throw switch interlocked with switch 116.

A pair of filters 163 and 164 are connected to the output of amplifier and detector 162. Filter 163 is a 60 cycle bandpass (or low-pass filter) which may be conventionally designed, that passes the 60 cycle phase-selecting information and attenuates the voice information.

A blocking capacitor 167 is connected between the output of 60 cycle filter 163 and phasing grid 146 of gated-beam tube 141. Also, a resistor 169 connects between phasing grid 146 and the B-minus voltage supply.

A 180° phase reversal for the transmitted phasing signal is built into the equipment in either its transmitting or receiving portion, so that an incoming phase, received on the phasing grids of the stations will be 180 degrees opposite in phase from the same phase designated on local phase-shift network 122. Such a phase shift may be obtained, for example, by an odd number of grounded-cathode type amplifiers in the chain of transmission or reception, or by connecting lead 138 to the switch terminal opposite the terminal with the assigned designation in Figure 3.

In operation, if a remote station wishes to call station D, the remote station will set its pole 131 at terminal D to transmit phase D, which will be received on the phasing grids of all gated-beam tubes 141 in the receiving stations and will be 180 degrees out-of-phase with phase D provided by lead 138 to limiter grid 145 in station D. The opposing phases on limiter grid 145 and phasing grid 146, respectively, in station D will totally prevent conduction of plate current through its gated-beam tube 141. Thus, no current will pass through plate resistor 148, and its plate will be at ground potential.

The control grid 171 of a switching and amplifying tube 172 is connected through a resistor 173 of a D.C. filter 174 and an isolation resistor 175 to plate 142. Since the cathode of tube 172 is connected to ground through a resistor 176, tube 172 will now be biased to the voltage at the plate of the gated-beam tube, which is zero volts when tube 141 does not conduct plate current. Thus, tube 172 will be in a conducting state, and can pass any information received by its control grid.

The high-pass (or bandpass) filter 164, connected to the output of amplifier and detector 162, passes the voice frequency band from 300 to 5000 cycles-per-second and does not pass the 60 cycle-per-second phase information. The output of high-pass filter 164 is connected to control grid 171 of switching and amplifying tube 172.

During reception of information intended for station D, tube 172 will be biased to a conducting state by the cutoff condition of gated-beam tube 141. Figure 4 illustrates the phase situation in gated-beam tube 141 when station D receives information intended for it. Thus, tube 172 will pass and amplify the voice information provided to its control grid by filter 174. A loud-speaker 181 is connected in the plate circuit of tube 172 so that the incoming voice information may be heard.

Figure 5:
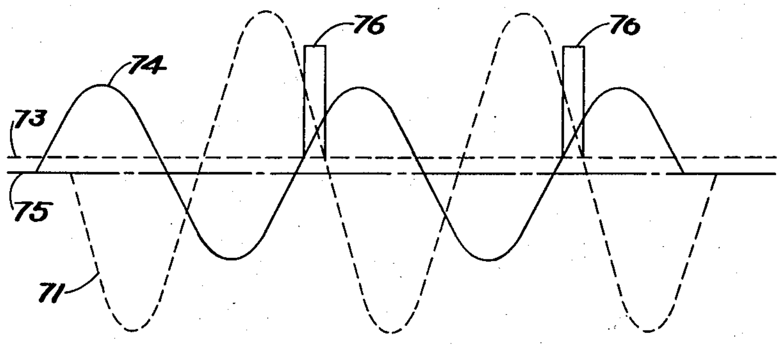

On the other hand, there will be many instances of conversations in the network of Figure 2 not involving station D. Where transmitted information is not intended for station D, but, for example, is being initiated by station F and is intended for station C, transmitting station F will set pole 131 of its tap switch 129 to contact C. All of the remote stations, including station D will then receive phase C upon their phasing grids 142. In station D, received phase C is displaced by 135 degrees from phase D being applied to its limiter grid 145. This phase situation is illustrated in Figure 5. It will be noted in Figure 5 that there is instantaneous phase coincidence between the waves over approximately a 45 degree period during each cycle. During this 45 degree period, a pulse 76 of plate current is generated and will pass through plate-resistor 148 to generate a negative direct-voltage at plate 142. A neon indicating light 182 is provided across plate resistor 148, and it will light when plate current flows in gated-beam tube 141 to indicate on the panel of station D that the system is being used by other stations.

The value of plate resistor 148 is selected so that the minimum current period, which in this case is approximately 45 degrees, will provide a sufficient direct-current component to bias switching tube 172 below cutoff and ignite neon light 182.

Furthermore, a lead 183 is connected from the output of D.C. filter 174 to the control grid of any tube in the transmitting section of the station, such as may be found in oscillator and modulator 113 or amplifier 114, to disable the transmission network in station D and in every other station in the network of Figure 2, except the initial transmitting station and its selected receiving station. Consequently, a private conversation is assured between the initial transmitting station and its selected station without the possibility of interference from other stations. If desired, lead 183 can be left out so that any non-selected station may break into a conversation to request use of the network, although the non-selected station still cannot receive the conversation because of the lockout in its receiving station.

When a selected station receives a transmission from an initiating station, the initiating station must announce its call letter. Then the receiving station can set its pole 131 to the assigned letter of the initiating station and can transmit to the initiating station, as well as receive from it.

Consequently, the first station that begins transmitting will obtain control of the system; and, when lead 183 is provided, no other station can interfere with its transmission, until the transmissions of the initiating and selected stations have ceased, or a sufficient time break occurs in their transmission. Such a time break must exceed a period determined by the time constant of direct-current filter 174. Generally, filter 174 will have a time constant which requires the time break to be a matter of seconds after a transmission ceases, because this amount of time is required for the voltage on tube 172 to rise above cutoff.

It is also possible to use the invention with radio-wave transmission, wherein an antenna is provided at each station. In this case, an additional modulation on the carrier is necessary for the reference-phase wave; which for example, may be transmitted on a subcarrier of the basic carrier frequency, or may be transmitted as an amplitude modulation on a frequency modulated output or vice versa, or may be transmitted at a harmonic or subharmonic frequency of the phase-selecting wave. In such case, any type of modulation may be used for transmission as long as means are provided at the receiving station to detect and separate the reference wave, the phase-selecting wave, and additional information, if any. The latter may be eliminated where only off-on information is needed at the receiving station.

It is, therefore, apparent that this invention provides a phase-selective control system, wherein any one of a number of transmitting stations may select any one of a number of receiving stations for a predetermined control function, while the system utilizes only a single frequency spectrum for all stations. Any control functions may be used, such as the reception of voice information or the operation of a relay. When used as an intercommunication system in a location having common wiring, no additional wiring need be provided for a communication network utilizing the invention, since it may use the power wiring as its information transmission means.

Furthermore, several different networks, each utilizing this invention, may simultaneously use the same power wiring, where each network is assigned a different frequency spectrum.

While particular forms of the invention have been shown and described, it is to be understood that the invention is capable of many modifications. Changes, therefore, in construction and arrangement may be made without departing from the scope of the invention as given by the appended claims.

I claim:

1. A phase-selective control system for a control station and a remote station in a network, said remote station including a gated-beam vacuum tube having at least a pair of grids, means for providing a reference-phase wave common to said control and remote stations, a first phase-shift means provided at said remote station and connected between said reference-wave means and one of the grids in said gated-beam tube to provide an assigned phase to one of said grids, said control station including a second phase-shift means connected to said reference-wave means, the output of said second-phase shift means being adjustable to a plurality of phases, carrier-wave means for conveying the output of said control station phase-shift means to the other grid of said gated-beam tube at said remote station, with one output phase of said control station conveyed to the other grid substantially 180 degrees out-of-phase with the assigned phase received on said one grid, the plate-current conduction of said gated-beam tube being substantially cut off by the assigned phase, and controlled means in said remote station actuated by the cutoff plate-current condition of said gated-beam tube, an electron control device, with its input connected to the plate of said gated-beam tube, means for providing different direct-voltage bias levels to said gated-beam tube and said electron control device to maintain the output of said device in a reversed conduction state from the plate-current of said gated-beam tube, and information responsive means connected to the output of said device, whereby said information responsive means in said remote station can be controlled by the phase-shift means of said control station.

2. A phase-selective control system for a control station and a plurality of remote stations, including means providing a reference-phase wave common to all of said stations, said control station having phase-shift means for providing any one of a plurality of output phased waves separated by discrete phase intervals, the remote stations each including a gated-beam tube that has at least first and second grids, other phase-shift means connected to the first grid of each gated-beam tube and to the reference-phase wave means to provide preassigned phases in each of the remote stations, carrier-wave means for conveying the output phased wave of the control stations as a modulation, means for demodulating the conveyed carrier wave at each remote station and applying it to the second grid of each of said gated-beam tubes, a plurality of utilizing means, each in a different remote station and actuated by the plate-current cutoff condition of its respective gated-beam tube, each utilizing means including an electron-control device, with its input connected to the plate of its gated-beam tube, means for providing different direct-voltage bias levels to said gated-beam tube and said electron control device to turn on the output of said device when there is substantial cutoff of the plate-current of the respective gated-beam tube, and switched means connected to the output of said device, whereby said switched means can be turned off and on from said control station.

3. A phase-selective control system for a plurality of stations, wherein any station can selectively actuate any other station, comprising reference-phase wave means common to all of said stations; each station including a gated-beam tube having at least two grids, and a phase-shift means in each station for providing a plurality of phases with respect to said reference-phase wave, each gated-beam tube having one grid connected to its respective phase-shift means to receive an assigned phase which may differ at each station, a phase-selective means associated with each phase-shift means to select any one of its plurality of phases as a calling phase, carrier-wave modulation means in each station for modulating a carrier-wave with the calling wave, a single wire network connecting all said stations for transmitting together said carrier-wave modulation and said reference-phase wave, a receiving means in each station, connecting means in each station being alternately connectable to its transmitting means and receiving means, a demodulation output of the receiving means in each station being connected to the other grid of its gated-beam tube, a utilizing means in each station actuated by a substantially null condition in the plate-current of its gated-beam tube, and the gated-beam tube of a given station having its plate-current in a substantially null condition when another station transmits a calling phase to it, whereby any station may selectively actuate the utilizing means in any other station, each of said utilizing means comprising an electron-control device, with its input connected to the plate of said gated-beam tube, means for providing different direct-voltage bias levels to said gated-beam tube and said electron-control device to maintain the output of said device in a reversed conduction state from the plate-current of said gated-beam tube, and information responsive means connected to the output of said device, each station including information modulation means to modulate the carrier wave at frequencies outside the calling wave modulation, filtering means for selecting the information and applying it to an input of said utilizing means, whereby the information responsive means in any station can be turned off and on at any other station to selectively communicate said information.

4. A phase selective control system for a plurality of stations, wherein any station may actuate any other station, comprising a power wiring network common to all of said stations, with the power wave of said power network being the reference-phase wave of the system, each station including a gated-beam tube having at least two grids, means for providing an assigned phase of said reference-phase wave to one grid of said gated beam tube in each station, a phase-shift means included in each station for sequentially providing as its phased-wave output one of a plurality of phases of said reference-phase wave, each station including an oscillator, means for modulating said oscillator with the phased-wave output of said phase-shift means, a transmitting means in each station having an input connected to the output of its modulating means, a receiving means in each station; a transmit-receive switch in each station including a pole and two alternately engageable contacts, with one of said contacts being normally-engaged, and said normally-engaged contact connected to the input of the receiving means of the respective station, demodulation means for detecting the modulated phased-wave said other contact connected to the output of the transmitting means of the respective station, and the pole connected to said power wiring network; said receiving means in each station being connected to the other grid of its respective gated-beam tube, said transmitting means of any of said stations recognizing a demodulated phased wave when it is substantially 180 degrees out-of-phase with the assigned phase of any other of said stations to be selected, wherein said transmitted signal substantially cuts off the plate current of the gated-beam tube of the selected station.

5. A phase selective control system for a plurality of stations wherein any station may be selectively actuated by any other station, comprising a power wiring network common to all of said stations, with the power wave of said power network being the reference-phase wave of the system; each station including a gated-beam tube having at least two grids, means included with said stations for providing waves with assigned phases to one grid of the gated-beam tube in each station, a phase-shift means in each station for sequentially providing as an output one of a plurality of phases with respect to said reference-phase wave, a transmitting means in each station having an input connected to the output of its phase-shift means, a receiving means in each station, a filter for selecting the frequency of the reference-phase wave connected between the output of the receiving means and the second grid of the gated-beam tube in each station; a switch in each station having at least a pole and double-throw contacts, with its pole connected to said power-wiring network, one contact of said switch normally engaged by the pole and connected to the input of its respective receiving means, and the opposite contact which is normally disconnected from the pole connected to the output of the respective transmitting means; a plurality of electron control devices, a direct-current filter in each station connected between the input of one of said electron control devices and the plate of its gated-beam tube, an information-utilizing device in each station connected to the output of its electron control device, said electron control device providing an actuating output when the plate current of its gated-beam tube is cut off, and the plate current of the gated-beam tube in a given station being cut off when it receives a phase being transmitted from another station 180 degrees out-of-phase with the assigned phase of the given station.

6. An intercommunication station which may be used in a network having a plurality of such stations comprising a gated-beam tube having at least two grids, a phase-shift means for sequentially providing a phase-selective output from one of a plurality of phases with respect to a reference-phase wave, station identification means for providing a wave with assigned phase to one grid of said gated-beam tube, an oscillator and modulating means, with the output of said phase-shift means connected as one of its inputs, a sound transducer providing another input to said oscillator and modulating means, a double-throw switch including a pole normally engaging one of its contacts, an amplifying means connected between said modulating means and another contact of said switch that is normally disengaged, wire means connected to the pole of said switch to convey modulation, amplifier and detector means having its input connected to the normally-engaged contact of said switch, a pair of filters connected to the output of said amplifier and detector means, one of said filters selectively passing the frequency of said phase-selective wave, and its output connected to the second grid of said gated-beam tube, a direct-current filter connected at one end to the plate of said gated-beam tube, an electron control means, direct-current biasing means being provided to said electron control means to maintain it in a cutoff state during plate-current conduction by said gated-beam tube, the output of said other filter selectively passing the sound transduced information, with its output connected to the input to said electron control means, an isolating impedance means connected between the other end of said direct-current filter and the input to said electron control device, and sound transducing means connected to the output of said electron control means, whereby said station receives incoming sound transduced information when the second grid of its gated-beam tube receives a wave that is 180 degrees out-of-phase with the assigned phase received by its first grid.

References Cited in the file of this patent

UNITED STATES PATENTS

| | | |
|---|---|---|
| 2,213,941 | Peterson | Sept. 3, 1940 |
| 2,223,840 | Wolff | Dec. 3, 1940 |
| 2,236,374 | Marrison | Mar. 25, 1941 |
| 2,424,585 | Simon et al. | July 29, 1947 |
| 2,511,143 | Adler | June 13, 1950 |
| 2,513,731 | Loughlin | July 4, 1950 |